United States Patent [19]

Lovett

[11] 4,105,415

[45] Aug. 8, 1978

[54] MULTI-PURPOSE TEST TUBE

[76] Inventor: Wayne D. Lovett, Rte. 1, P.O. Box 561, Columbia, S.C. 29203

[21] Appl. No.: 678,976

[22] Filed: Apr. 21, 1976

[51] Int. Cl.[2] ........................ B01L 3/14; G01N 21/24

[52] U.S. Cl. ........................................ 23/292; 350/95; 356/197; 356/246

[58] Field of Search ............... 23/292, 259; 195/103.5, 195/127; 350/92, 95; 356/197, 246; 233/26

[56] References Cited

U.S. PATENT DOCUMENTS

| | | | |
|---|---|---|---|
| 2,009,690 | 7/1935 | Flowers | 23/292 X |
| 3,170,838 | 2/1965 | Archer | 233/26 |
| 3,235,175 | 2/1966 | McCormick | 233/26 |
| 3,481,712 | 12/1969 | Bernstein et al. | 350/92 X |
| 3,713,775 | 1/1973 | Schmitz | 356/197 X |
| 3,814,522 | 6/1974 | Clark et al. | 356/197 |

*Primary Examiner*—Joseph Scovronek
*Assistant Examiner*—Arnold Turk
*Attorney, Agent, or Firm*—Larry Harold Kline

[57] ABSTRACT

A tube is disclosed, for use in testing specimens in a solution, comprising a plurality of vertical, transparent compartments at the bottom of the tube enabling the tube to be used for ordinary tube tests and for plate tests.

5 Claims, 6 Drawing Figures

MULTI-PURPOSE TEST TUBE

This invention relates to testing apparatus, and more particularly to a test tube, which can be used not only for ordinary tube tests, but also for plate tests.

Many tests are required to examine specimen for various animal and human diseases. Many of these tests can be performed in an ordinary test tube. Some other tests must be performed, at the present time, on a plate, since light must travel through the solution adequately enough for the testor to notice changes in the solution. The present invention enables both present-day tube and plate tests to be performed by use of a novel test tube.

An object of the present invention is to provide a test tube in which a present-day plate test can be performed.

Another object of the present invention is to provide a narrow bottom compartment on a test tube in which a present-day plate test can be performed.

Still another object of the present invention is to perform a present-day plate test in a tube so that the solution will not dry out quickly.

Another object of the present invention is to provide a narrow compartment in the bottom of a tube through which light can travel sufficiently for changes to be noticed in the solution inside the narrow compartment.

Still another object of the present invention is to provide a plurality of narrow compartments in the bottom of a tube so that the same tube may be usable for different quantities of solution.

These and other objects and features of the invention will be apparent from the following description and appended claims.

Briefly, the invention is a tube for use in testing specimens in a solution comprising a plurality of narrow compartments in the bottom of the tube. Sufficient light may pass through the solution in the plurality of narrow compartments for changes in the solution to be noticeable. The presence or non-presence of these changes provides information about these specimens. Each of the plurality of narrow compartments comprises a front piece, a right edge attached to the front piece, a rear piece attached to the right edge, and a left edge attached to the front piece and to the rear piece. The lowest of the plurality of narrow compartments has a bottom. A large circular compartment is located above the plurality of narrow compartments. The large circular compartment is formed from circular glass. Right side tube glass is attached to each of the right edges of the plurality of narrow compartments, and to the circular glass. Left side tube glass is attached to each of the left edges of the plurality of narrow compartments, and to the circular glass. A glass bottom is secured to the right side tube glass and the left side tube glass, and is attached to the bottom of the lowest of the plurality of narrow compartments. A front slanting edge and a rear slanting edge are attached to the large circular compartment, and extend to the highest of the plurality of narrow compartments, where they are attached. Extending from each of the plurality of narrow compartments to the next lowest of the plurality of narrow compartments is a front slanting edge and a rear slanting edge. The right side tube glass and the left side tube glass are solid glass.

The invention will be more fully understood from the following detailed description and appended claims when taken with the drawings in which:

Figure 1:
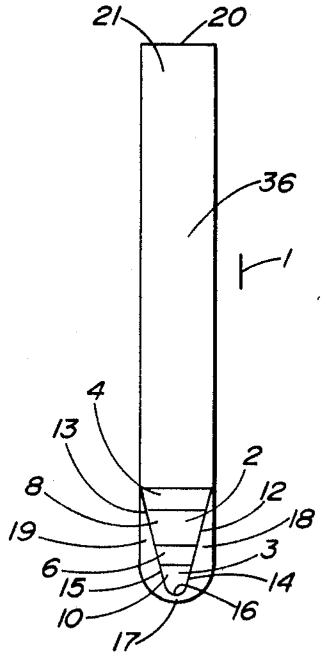
FIG. 1 is a full front view of a tube with a plurality of narrowed compartments.

Referring now to the drawings, FIG. 1 is a full front view of a tube with a plurality of narrowed compartments. FIG. 1 shows tube 1 with first narrow compartment 2 and second narrow compartment 3. Tube 1 has a top opening 20 and normal tube compartment 21.

Figure 2:
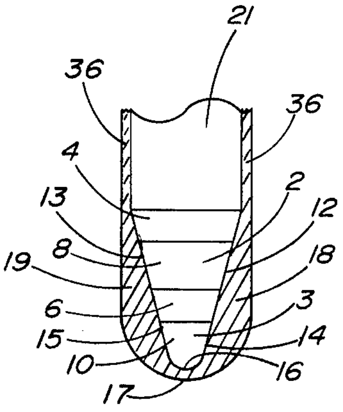
FIG. 2 is an enlarged front section view of the bottom of the tube in FIG. 1.

FIG. 2 is an enlarged front section view of the bottom of the tube in FIG. 1. FIG. 2 shows first narrow compartment front piece 8 of first narrow compartment 2. Second narrow compartment 3 has second compartment front piece 10. First narrow compartment 2 has first compartment right side edge 12 and first compartment left side edge 13. Second narrow compartment 3 has second compartment right side edge 14 and second compartment left side edge 15. Tube 1 has circular tube glass 36. When the bottom of tube 1 is compressed into first narrow compartment 2 and second narrow compartment 3, right side tube glass 18 and left side tube glass 19 are on the respective sides of first narrow compartment 2 and second narrow compartment 3. Second narrow compartment 3 has a bottom 16. Bottom 16 comprises a rounded surface. A rounded surface, such as bottom 16, is located on the one of the plurality of vertical, transparent compartments nearest the closed end in the bottom section of the tube. Below bottom 16 is tube glass bottom 17.

Figure 3:
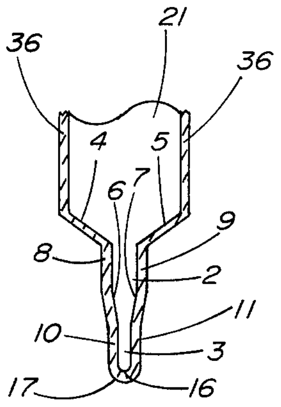
FIG. 3 is an enlarged right side section view of the bottom of the tube in FIG. 1.

FIG. 3 is an enlarged right side section view of the bottom of the tube in FIG. 1. FIG. 3 shows first front slanting edge 4 and first rear slanting edge 5 which lead from the normal tube compartment 21 into the first narrow compartment 2. Second front slanting edge 6 and second rear slanting edge 7 extend from first narrow compartment 2 to second narrow compartment 3. First narrow compartment 2 has first compartment front piece 8 and first compartment rear piece 9. Second narrow compartment 3 has second compartment front piece 10 and second compartment rear piece 11.

Figure 4:
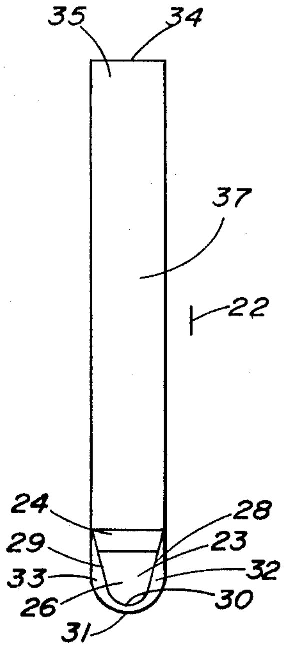
FIG. 4 is a full front view of a tube with a single narrow compartment in the bottom of the tube.

FIG. 4 is a full front view of a tube with a single narrow compartment in the bottom of the tube. FIG. 4 shows tube 22 with top opening 34 and normal tube compartment 35. Tube 22 has a narrow compartment 23 at the bottom of the tube 22. Narrow compartment 23 has a front piece 26 and a bottom 30. Narrow compartment 23 has right side edge 28 and left side edge 29.

Figure 5:
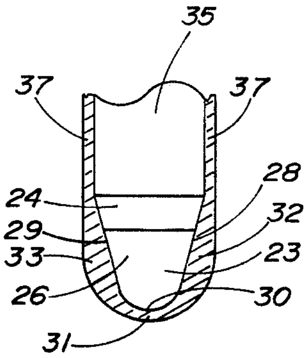
FIG. 5 is an enlarged front section view of the bottom of the tube in FIG. 4.

FIG. 5 is an enlarged front section view of the bottom of the tube in FIG. 4. FIG. 5 shows tube 22 with circular tube glass 37. When the bottom of tube 22 is compressed into narrow compartment 23, right side tube glass 32 and left side tube glass 33 are on the respective sides of narrow compartment 23. Tube glass bottom 31 is below bottom 30 of narrow compartment 23.

Figure 6:
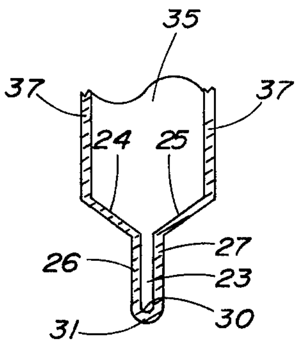
FIG. 6 is an enlarged right side section view of the bottom of the tube in FIG. 4.

FIG. 6 is an enlarged right side section view of the bottom of the tube in FIG. 4. FIG. 6 shows front slanting edge 24 and rear slanting edge 25 extended from normal tube compartment 35 to narrow compartment 23. Narrow compartment 23 has front piece 26 and rear piece 27.

Tubes 1 and 22 are both capable of use for tube tests and the present-day plate tests. The narrow compartments 2 and 3 in tube 1, and 23 in tube 22 are narrow enough so that light will travel through a solution therein adequately enough for the testor to read changes therein. Various specimens can be combined and tested within the tubes herein by placing them in the tube through top openings 20 and 34.

There are many advantages to this new invention. A sample will not dry out as quickly in these tubes as it would on an ordinary plate test. The tube also would only have to be shaken in order to mix the solution, rather than using a mixing instrument as is required in an ordinary plate test. If a tube test and a plate test need to be performed on the same specimen, the tests could be set up at the same time and unnecessary extra handling of the specimen would be prevented.

The tubes are sufficiently sturdy, and have stability and strength at the bottoms, aided by solid glass. The right side tube glass and the left side tube glass can be solid to aid in stability and strength. The tubes, being sturdy and stable, could fit on an ordinary test tube rack along with ordinary test tubes.

The tubes can be constructed with a plurality of narrowed compartments. The plurality could be two or more compartments.

Compartment 2 may be ⅛ inch wide and compartment 3 may be 1/16 inch wide. In compartment 3, even the smallest solution should be readable. These dimensions may be varied by the individual designer and testor without varying from this invention.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A tube, for use in testing specimens in a solution, comprising a tube having an open end at the top, a closed end at the bottom, an upper tube compartment and a bottom section; said bottom section comprising a plurality of vertical, transparent compartments, said transparent compartments being vertically aligned one above another, each of said vertical, transparent compartments forming a flattened section; each of said plurality of vertical, transparent compartments comprising a front piece, a right edge sloping inwardly towards the closed end, a rear piece and a left edge sloping inwardly towards the closed end, said pieces and edges being respectively attached to each other to form said compartments; the lowermost compartment having a bottom comprising a rounded inner surface; a plurality of edges slanting inwardly towards the closed end connecting said vertical, transparent compartments to one another and to the upper tube compartment; whereby sufficient light may pass through solution contained in any one of said plurality of vertical, flattened compartments for changes in said solution to be noticeable, thereby providing information about specimens to be tested.

2. A tube according to claim 1 wherein said plurality of vertical, transparent compartments comprises two compartments.

3. A tube according to claim 2 wherein said right and left sloping edges comprise thickened portions joined to a rounded outer bottom.

4. A tube according to claim 1 wherein said right and left sloping edges comprise thickened portions joined to a rounded outer bottom.

5. A tube according to claim 4 wherein the material of construction is glass.

* * * * *